(12) United States Patent
Woodworth et al.

(10) Patent No.: US 11,689,611 B2
(45) Date of Patent: Jun. 27, 2023

(54) NETWORK OPTIMIZATION SYSTEM USING SERVER LATENCY MEASUREMENTS

(71) Applicant: Level 3 Communications, LLC, Broomfield, CO (US)

(72) Inventors: John R. B. Woodworth, Amissville, VA (US); Dean Ballew, Sterling, VA (US); Paul Carpenter, Tulsa, OK (US); William R. Power, Boulder, CO (US); Laurence R. Lipstone, Calabasas, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 17/804,225

(22) Filed: May 26, 2022

(65) Prior Publication Data

US 2022/0407913 A1 Dec. 22, 2022

Related U.S. Application Data

(60) Provisional application No. 63/213,444, filed on Jun. 22, 2021.

(51) Int. Cl.
*H04L 67/101* (2022.01)
*H04L 43/0864* (2022.01)
*H04L 43/16* (2022.01)

(52) U.S. Cl.
CPC ........ *H04L 67/101* (2013.01); *H04L 43/0864* (2013.01); *H04L 43/16* (2013.01)

(58) Field of Classification Search
CPC ... H04L 67/101; H04L 43/0864; H04L 43/16; H04L 67/01
See application file for complete search history.

(56) References Cited

U.S. PATENT DOCUMENTS

| | | | | |
|---|---|---|---|---|
| 6,601,098 B1* | 7/2003 | Case | ..................... | H04L 69/329 709/224 |
| 6,606,643 B1* | 8/2003 | Emens | ..................... | H04L 67/02 709/200 |
| 6,795,858 B1* | 9/2004 | Jain | ..................... | H04L 67/1008 709/244 |
| 7,058,706 B1* | 6/2006 | Iyer | ..................... | H04L 43/0852 709/224 |
| 2012/0117253 A1* | 5/2012 | Scoda | ................... | H04L 67/563 709/227 |
| 2015/0046558 A1* | 2/2015 | Padgett | ................... | H04L 45/26 709/217 |

FOREIGN PATENT DOCUMENTS

| | | |
|---|---|---|
| EP | 0959601 | 11/1999 |
| EP | 3609134 | 2/2020 |

OTHER PUBLICATIONS

International Search Report and Written Opinion of the International Searching Authority, dated Sep. 15, 2022, Int'l Appl. No. PCT/US22/072593, Int'l Filing Date May 26, 2022; 12 pgs.

* cited by examiner

*Primary Examiner* — Johnny B Aguiar

(57) ABSTRACT

The present application describes a system and method for determining a latency between a client device and various servers of a networking system.

20 Claims, 6 Drawing Sheets

NETWORK OPTIMIZATION SYSTEM USING SERVER LATENCY MEASUREMENTS

CROSS-REFERENCE TO RELATED APPLICATIONS

This application claims the benefit of U.S. Provisional Application No. 63/213,444 filed Jun. 22, 2021, entitled "Network Optimization System Using Latency Measurements," which is incorporated herein by reference in its entirety.

BACKGROUND

In an Anycast network routing protocol, a single IP address may be associated with a number of different servers. A router will select a routing path to the best server based on various factors. These factors may include a number of hops from a client device to a server and/or geographical/topographical distance of servers. However, in some instances, a server associated with an Anycast network may become congested or otherwise be over utilized. As a result, latency between the client device and the server may increase and performance of the network may be negatively impacted.

SUMMARY

The present application describes a system and method for determining latency between a client device and two or more servers associated with a network. In an example, the network may utilize an Anycast network routing protocol although other network routing protocols may be used.

In order to determine the latency between the client device and the two or more servers, a first server, in response to receiving an initial request from the client device, provides a first redirect instruction to the client device. The first redirect instruction causes the client device to send a second request to a second server. Upon receipt of the first redirect instruction, the client device sends the second request to the second server. Upon receiving the second request, the second server sends a second redirect instruction to the client device, which causes the client device to submit a final request to the first server. Upon receiving the final request, the first server can determine the latency between itself and the client device as well as the latency between the client device and the second server. If the latency between the client device and the second server is less than the latency between the client device and first server, the client device will be instructed to send subsequent requests to the second server.

Accordingly, the present application describes a method for determining a latency between a client device and two or more servers. The method includes determining that a latency measurement instruction has been issued. Based on determining that the latency measurement instruction has been issued and in response to receiving a first request from a client device, the first server provides a first redirect response to the client device. The first redirect response causes the client device to submit a second request to a second server. The first server subsequently receives a final request from the client device. The final request is provided to the first server from the client device based on the client device receiving a second redirect response from the second server. The first server may determine a latency measurement between the client device and the second server based, at least in part, on a time between when the first redirect response is provided to the client device and when the final request is received by the first server.

The present application also describes a system, comprising a processor and a memory coupled to the processor. The memory stores instructions that, when executed by the processor, perform operations. The operations may include receiving a latency measurement instruction. Based on receiving the latency measurement instruction and in response to receiving a first request from a client device, a first redirect response is provided to the client device. The first redirect response causes the client device to submit a second request to a server. A final request may subsequently be received. The final request is provided from the client device based on the client device receiving a second redirect response from the server. A latency measurement between the client device and the server is determined. The latency measurement is based, at least in part, on a time between when the first redirect response is provided to the client device and when the final request is received.

Also described is a method comprising providing a latency measurement instruction to a first server. The latency measurement instruction causes the first server to provide a first redirect response to a client device. The first redirect response causes the client device to submit a second request to a second server. The latency measurement instruction also causes the first server to receive a final request. The final request is provided from the client device based on the client device receiving a second redirect response from the second server. A latency measurement is then received from the first server. The latency measurement is based, at least in part, on a time associated with the first redirect response and the final request.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1A:
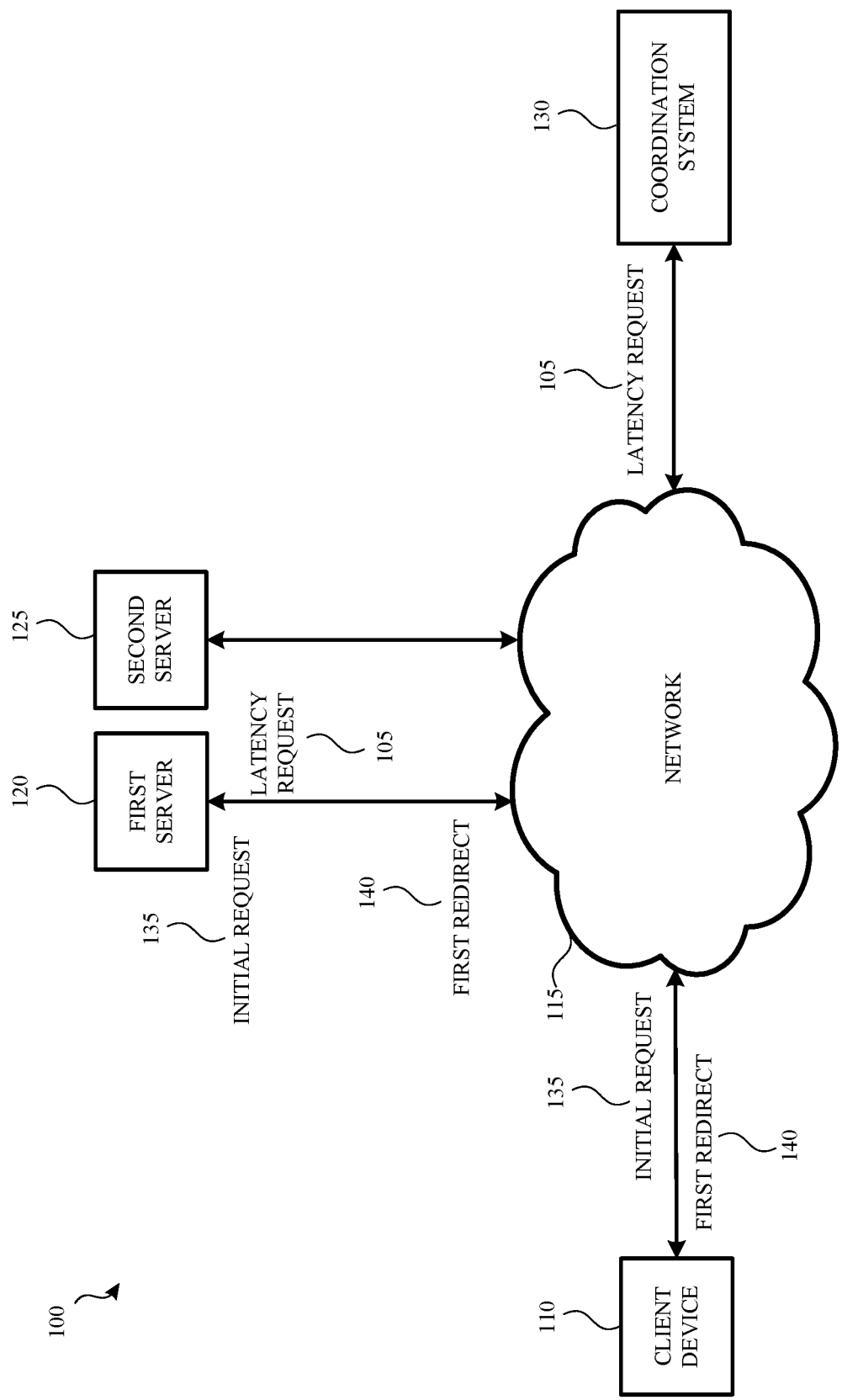
FIG. 1A illustrates an example networking system in which examples of the present disclosure may be practiced.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Anycast networks and various network segments of the Anycast networks are comprised of various network resources. Network resources may include routers and servers. In an example, some of the network resources (e.g., a first server and a second server) may be assigned to various client devices in a particular area. Each server may share the same IP address or a similar IP address.

When a client device sends a request (e.g., a content request) via a router or other network resource, the router forwards the request to servers that are topographically and/or geographically closest to the client device. As indicated above, the client device may be associated with a particular area and the area may be assigned one or more servers. Use of servers that are topographically/geographically closest to the client device helps reduce and/or minimize administrative costs (e.g., bandwidth costs, number of hops) of the network and may reduce latency between a client device and a server. As a result, load times and network availability for end users is improved.

However, in some instances, a server associated with the geographic area (or with a particular IP address) may become congested. As a result, latency may increase, thereby negatively impacting the overall performance of the network. In another example, the client device may be a relatively new computing device to the network. When the client device is added to the network, an optimal server and/or path to the server may not have been discovered. As a result, the client device may not be connected and/or communicating with the server in the most efficient manner or may be connected to a server that has a higher latency in responding to the client than another server that can perform the same function.

In order to remedy the above, the present application describes a system that determines latency measurements between a client device and various servers. For example, when a client device sends a request to a first server, the first server may initiate a latency measurement procedure. The latency measurement procedure may determine whether latency between the first server and the client device is greater than, substantially equivalent to, or less than latency between the client device and a second server.

In some examples, the client device may not have knowledge or otherwise have access to both the first server and the second server. For example, in an Anycast network, it may be determined (e.g., by a router or other network service device) that the first server is the geographically and/or logically closest server to the client device. As such, any requests originating from the client device may be provided to the first server. Although the client device may not have knowledge and/or access to the second server, the first server may have knowledge of its neighboring servers. Accordingly, latency measurements between the client device and the second server may be coordinated and measured by the first server.

In order to determine latency between the second server and the client device, when the first server receives a request from the client device, the first server responds to the client device with a first redirect response. The first redirect response instructs the client device to submit the request to the second server. When the first redirect response is received by the client device, the client device sends a second request to the second server. In response to receiving the second request, the second server provides a second redirect request back to the client device. The second redirect request instructs the client device to submit a third, final request to the first server. Upon receiving the third request, the first server may provide a final response to the client device.

Upon completion of the above, the first server may determine a latency measurement between the client device and the second server. The latency measurement is determined based at least in part on an amount of time between when the first redirect request is sent to the client device and when the final request is received from the client device. The first server knows or is otherwise able to determine the latency between itself and the client device. For example, the latency between the first server and client device may be determined based, at least in part, on an amount of time it takes for the initial request and the first redirect response to be transmitted between the first server and the client device and/or on an amount of time it takes for the third request and the final response to be transmitted between the first server and the client device. Once this time period is known, the first server can determine an amount of time it takes for the second request to be sent to the second server and an amount of time it takes for the second redirect request to be sent to the client device.

The determined latency between the client device and the second server may be compared with the determined latency between the client device and the first server. If the latency between the client device and second server is less than the latency between the client device and the first server, the client device may be instructed to send subsequent requests to the second server. In an example, subsequent requests from the client device are sent to the second server when a difference in the latency between the first server and the second server is above a latency difference threshold.

Although the examples herein are described with respect to an Anycast network, the examples may be applied to various types of network routing protocols. These and other examples will be explained in more detail below with respect to FIG. 1A-FIG. 4.

FIG. 1A illustrates an example networking system 100 in which examples of the present disclosure may be practiced. The example networking system 100 may be an Anycast networking system although other networking systems are contemplated.

The networking system 100 may include a number of different network service devices such as routers and servers. The routers and servers may be part of, integrated with, or otherwise associated with a network 115. Although a single network 115 is shown and described, the networking system 100 may include any number of networks and/or network segments. Additionally, the networking system 100 may include any number of servers and any number of client devices. In an example, each server and client device in the networking system 100 may be associated with the same or similar geographic area.

For example, a first server 120 and a second server 125 may be associated with or otherwise assigned to a particular geographic area. Likewise, the client device 110 may be associated with the same geographic area. Due to the proximity between the client device 110 and the first server 120 and/or the second server 125, any requests (e.g., content requests) originating from the client device 110 may be directed to the first server 120 and/or the second server 125 via the network 115. In an example, the first server 120 and the second server 125 are associated with the same router and/or the same IP address. In another example, the first server 120 and the second server 125 are associated with different routers and/or different IP addresses. For example, the first server 120 and the second server 125 may share an IP address of 192.0.2.0. In another example, the first server 120 may have an IP address of 192.0.2.0 and the second server 125 may have an IP address of 192.0.2.1.

The system 100 may also include a coordination system 130. In some examples, the coordination system 130 may be part of or otherwise associated with a domain name system. The coordination system 130 may be responsible for assigning a client device 110 to a particular server (e.g., first server 120) when the client device 110 joins or otherwise accesses the network 115. The coordination system 130 may assign the client device 110 to the first server 120 based on a proximity of the client device 110 to the first server 120. The proximity between the client device 110 and the first server 120 may reduce latency between the client device 110 and the first server 120 when compared with other servers that are geographically or logically farther away from the client device 110.

In other examples, a router associated with the network 115 may route requests from the client device 110 to a particular server (e.g., the first server 120) that has been assigned a particular IP address. The router may route the requests to the particular server based on a number of hops between a gateway from which the client device 110 enters the network and the particular server.

In such an example, the coordination system 130 may be configured to effectively override the assignments described above by assigning the client device 110 to a particular server. Assigning the client device 110 to the particular server may reduce latency. In an example, the coordination system 130 may perform the assignment in response to various events such as, for example, network attacks or packet loss. In another example, the coordination system 130 may perform the assignment when the client device 110 has been connected to the network 115 for a period of time. Once the period of time has expired, the coordination system 130 may determine whether the client device 110 may be better served by a different server. The different server may be a neighboring server to the first server 110, be assigned to the same geographic area and/or have the same number of hops. For example, the coordination system 130 may be able to determine whether latency associated with the client device 110 can be reduced by communicatively coupling the client device 110 to the second server 125 rather than causing the client device 110 to be communicatively coupled to the first server 120. In the examples described herein, the client device 110 may not have knowledge of, or otherwise have access to, the second server 125.

In order to determine whether latency associated with the client device 110 can be reduced, the coordination system 130 may submit a latency request 105 to the first server 120 via the network 115. The latency request 105 initiates the various redirect requests described below.

The latency request 105 may be provided to the first server 120 in response to various factors and/or events. For example, the latency request 105 may be provided to the first server 120 in response to expiration of a timer or some other time-based metric of the network 115. Accordingly, the latency request 105 may be provided to the first server 120 periodically.

In another example, the latency request 105 may be provided to the first server 120 in response to the coordination system 130 detecting or otherwise receiving information that indicates latency between the first server 120 and the client device 110 is above a desired level or threshold. In yet another example, the latency request 105 may be provided to the first server 105 in response to the client device 110 accessing the network 115 for a first time and/or for a threshold number of times.

In some examples, when the latency request 105 is provided to the first server 120, the first server 120 may send a prompt or other such command to the client device 110 that causes the client device 110 to send an initial request 135 such as described below. In another example, the initial request 135 may be any request provided by the client device 110 to the first server 120 once the first server 120 has received the latency request 105 or has otherwise detected and/or been informed that a latency request has been issued by the coordination system 130. In yet another example, when the latency request 105 is received by the first server, the first server 120 may wait for a request that satisfies certain criteria (e.g., a request having a small payload) and may classify the received request as the initial request 135 and perform the operations described below. Although the latency request 105 is explained as being provided to the first server 120, the latency request 105 may also be provided to the client device 110 and the client device 110 may initiate sending of an initial request 135 such as described below.

Once the latency request 105 is received by the first server 110, and in response to the first server 120 receiving an initial request 135 from the client device 110, the first server 120 provides a first redirect request 140 to the client device 110 via the network 115. In an example, the initial request 135 includes or is otherwise associated with a minimal amount of data. For example, a payload of the initial request 135 may include a one-pixel image or a zero-pixel image. In another example, the initial request 135 may only include a header in order to reduce bandwidth and computational requirements required for performing the operations described herein. In yet another example, the item included in the initial request 135 may be a cached item and the initial request 135 may be a request to determine whether the cached item has been updated. Although specific examples are given, the initial request 135 may be any suitable request having a negligible payload so as to minimize bandwidth usage as the requests are sent and/or received.

The first redirect request 140 includes an instruction that causes the client device 110 to send a second request 145 (FIG. 1B) to the second server 125. The second request 145 may be similar to the initial request 135. For example, the second request 145 may include the same payload as the initial request 135 but be directed to the second server 125 instead of the first server 120. In an example, client device 110 may not have knowledge of and/or access to, the second server 125. As such, the first redirect request 140 may include instructions regarding how the client device 110 is to communicatively couple with the second server 125 via the network 115. In another example, the first redirect request 140 may include instructions that causes a router associated with the first server 120 and the second server 125 to route the second request 145 to the second server 125.

In an example, the first server 120 and the second server 125 may have an equivalent number of hops with respect to the client device 110. Additionally, the first server 120 may have knowledge of the second server 125 based on instructions and/or information provided to the first server 120 from the coordination system 130. For example, the latency request 105 may include information about various servers that are accessible to the client device 110 via the network 115 or are otherwise associated with the same geographic area.

As the initial request 135 and the first redirect request 140 are exchanged, the first server 120 may calculate or otherwise determine an amount of time it takes for this exchange of information to occur. As used herein, the first exchange of information is referred to as a "first roundtrip." In an example, the first server 120 may only be able to determine an amount of time required for a first leg of the first roundtrip (e.g., an amount of time it takes for the first server 120 to receive the initial request 135 from the client device 110). In an example, the first leg of the first roundtrip may be determined based, at least in part, on comparing a time stamp associated with the initial request 135 with a time that the first server 120 received the initial request 135. Once the amount of time required for the first leg of the first roundtrip is determined, the first server 120 may infer or otherwise determine that the second leg of the first roundtrip should or will take the same amount of time or substantially the same amount of time. As such, the first server 120 may be able to determine the latency between itself and the client device 110 for the first roundtrip (referred to herein as a "first latency").

Figure 1B:
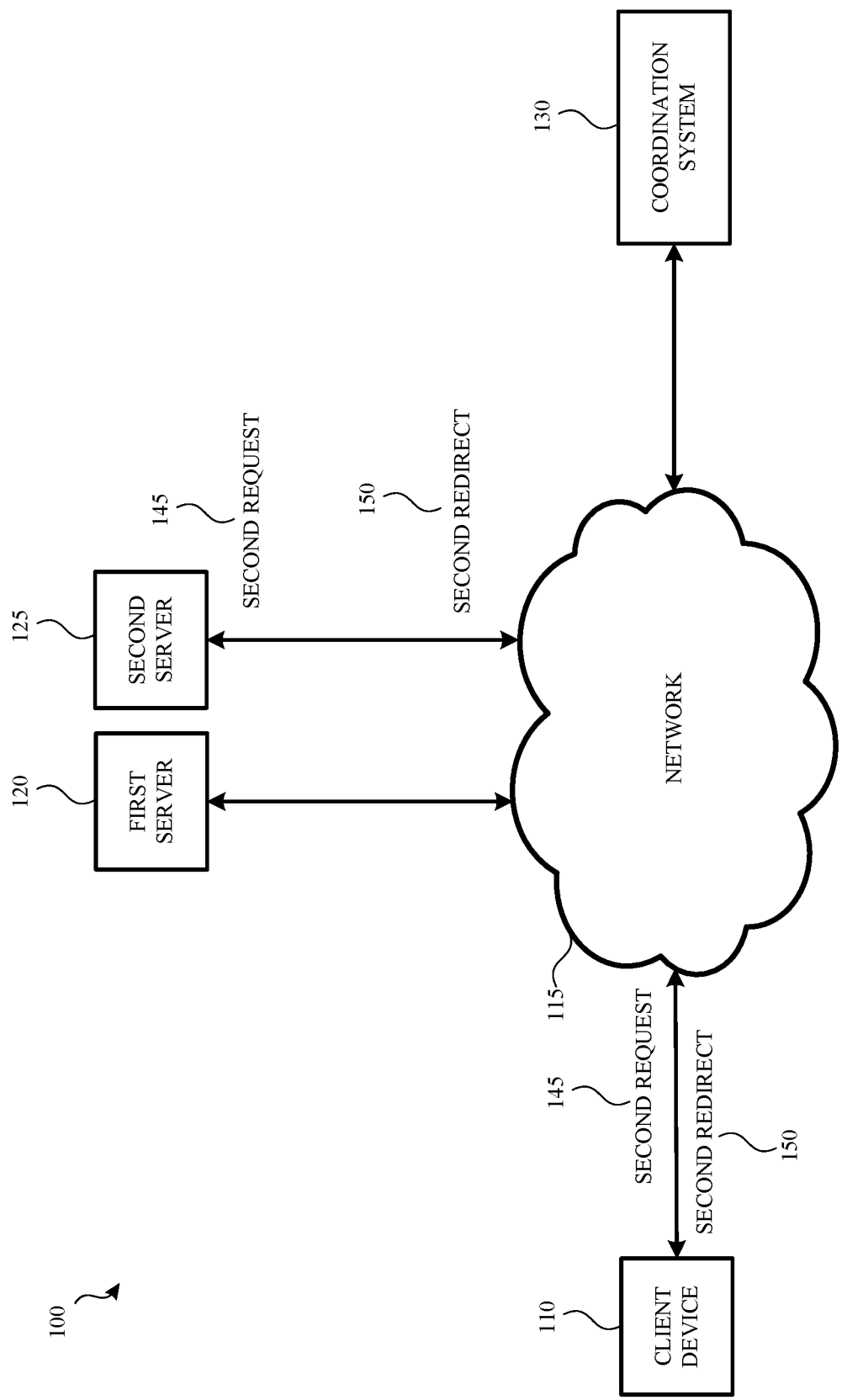
FIG. 1B illustrates the example networking system of FIG. 1A in which a second request is provided to a second server associated with the networking system according to an example.

FIG. 1B illustrates the example networking system 100 of FIG. 1A in which a second request 145 is provided to a second server 125 associated with the networking system 100 according to an example. As explained above, the second request 145 is provided to the second server 125 via the network 115 in response to the client device 110 receiving the first redirect request 140. In an example, the content of the second request 145 may be the same or similar to the content of the first request 140 described above.

When the second server 125 receives the second request 145, the second server 125 may respond with a second redirect request 150. In an example, the second server 125 may be instructed to provide the second redirect request 150 to the client device in response to an instruction received by the coordination system 130. In another example, the second request 145 may include an instruction or other notification that causes the second server 125 to respond with the second redirect request 150. This exchange of information is referred to herein as a "second roundtrip." The amount of time it takes for the second roundtrip may be used to determine a "second latency" between the client device 110 and the second server 125. However, because the second roundtrip occurs between the second server 125 and the client device 110, the first server 120 does not have knowledge of the second roundtrip or the time it takes for the second roundtrip to occur until receiving the final request (as explained below).

Figure 1C:
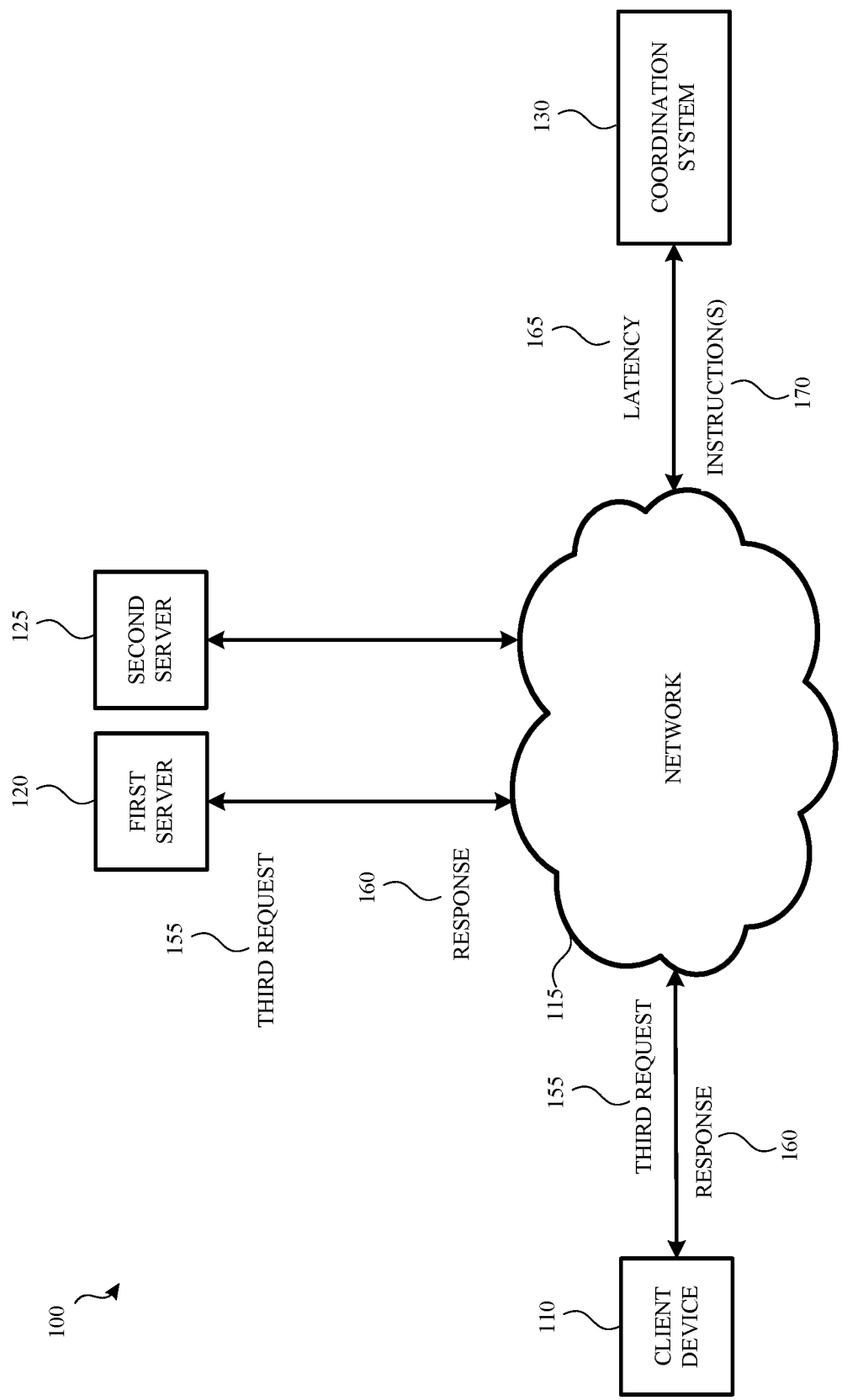
FIG. 1C illustrates the example networking system of FIG. 1B in which a final request is provided to the first server according to an example.

Once the second redirect request 150 is received by the client device 110 and referring to FIG. 1C, the client device 110 provides a final or third request 155 to the first server 120 via the network 115. Once the first server 120 receives the third request 155, the first server 120 provides a response 160 back to the client device 110, including the requested information. This exchange of information between the client device 110 and the first server 120 is referred to herein as a "third roundtrip." The amount of time it takes for the third roundtrip may be used to determine a "third latency" between the client device 110 and the first server 120.

In an example, the first latency and the third latency may be equivalent or substantially equivalent. As with the first roundtrip, the first server 120 may only be able to determine an amount of time it takes to complete a first leg of the third roundtrip. For example, the first server 120 may compare a time stamp associated with the third request 155 with a time that the first server 120 receives the third request 155. Using this information, the first server 120 may determine a total amount of time it took to complete the third roundtrip and/or may be able to calculate the third latency.

Once the response 160 is provided to the client device 110, the first server 120 may determine the total amount of time it took for the second roundtrip to occur. For example, the first server 120 may determine the amount of time it took for the client device 110 to send the second request 145 to the second server 125 and the amount of time it took the second server to send the second redirect request 150 to the client device 110. For example, the first server 120 may determine an amount of time between when the first redirect request 140 (FIG. 1A) is sent to the client device 110 and when the final or third request 155 is received by the first server 120.

The first server 155 may then subtract twice the amount of time between when the initial request 135 is sent by the client device 110 and received by the first server 120 (or twice the amount of time between when the third request 155 is sent by the client device 110 and received by the first server 120) to determine the second latency. As explained above, the time between when the initial request 135 is sent by the client device 110 and received by the first server 120 may be equivalent or substantially equivalent to the amount of time between when the third request 155 is sent by the client device 110 and received by the first server 120. Thus, these amounts of time may be interchangeable. In other examples, an average of the two may be used.

Once the amount of time for the second roundtrip is determined, the first server 120 may determine the second latency between the client device 110 and the second server 125. For example, the first server 120 may determine that the first leg of the first roundtrip (e.g., the amount of time it took the first server 120 to receive the initial request 135 from the client device 110) took a total of 3 ms. The first server 120 may then determine that the second leg of the first roundtrip (e.g., the amount of time it took the client device 110 to receive the first redirect request 140 from the first server 120) also took 3 ms. Thus, the first roundtrip time may be 6 ms.

Continuing with the example, the first server 120 may determine that the first leg of the third roundtrip (e.g., the amount of time it took the first server 120 to receive the third request 155 from the client device 110) took a total 3 ms. The first server 120 may then determine that the second leg of the third roundtrip (e.g., the amount of time it took the client device 110 to receive the response 160 from the first server 120) also took 3 ms. Thus, the third roundtrip time may be 6 ms.

The first server 120 may also determine (e.g., based on time stamp information associated with the various requests) that an elapsed amount of time between when the first redirect request 140 is provided to the client device 110 and when the third request 155 is received by the first server 120 is 8 ms. In order to determine the second latency and/or the second amount of time for the second roundtrip, the first server 120 subtracts 6 ms (e.g., 3 ms for the first leg of the first roundtrip and 3 ms for the first leg of the third roundtrip (or twice the determined amount of time for either the first leg of the first roundtrip or the first leg of the third roundtrip since these values are substantially equal)) from 8 ms to determine that the second amount of time is 2 ms. Accordingly, the first server 120 may determine that a first leg of the second roundtrip is 1 ms and a second leg of the second roundtrip is 1 ms.

The first server 120 may then provide the second latency, either alone or in combination with the first latency and/or the third latency (represented in FIG. 1C as latency 165) to the coordination system 130. The coordination system 130 may compare the second latency with the first latency and/or the third latency to determine whether the second latency is an improvement over the first latency and/or the third latency. If the second latency is an improvement over the first latency and/or the third latency, the coordination system 130 may provide instructions 170 to the client device 110, the first server 120 and/or the second server 125 that causes subsequent requests issued by the client device 110 to be provided to the second server 125. In another example, the coordination system 130 may provide the instructions 170 to one or more routers in the network 115. When the instructions 170 are received by the one or more routers, the one or more routers will route subsequent requests to the specified server.

In an example, a difference between the second latency and the first latency and/or the third latency may be required to be over a latency difference threshold if the instructions 170 are provided. For example, the latency difference threshold may be a ten percent difference or more, a twenty percent difference or more a thirty percent difference or more, etc. If the latency difference is not above the latency difference threshold, the coordination system 130 may not send the instructions 170. As a result, the client device 110 may send subsequent requests to the first server 120.

In some examples, when it is determined that the client device 110 should send subsequent requests to the second server 125, the coordination system 130 may also send instructions 170 to other computing devices associated with the client device 110 that the other computing device should start sending requests from the client device 110 to the second server 125. For example, the other computing devices may be part of the same household as the client device 110. In another example, the other computing devices may access the same router or other network service device as the client device 110. In yet another example, instructions 170 may be sent to some of the other computing devices but not others. The other computing devices and/or the client device 110 may be identified using breadcrumbs or other such identifiers that enable the coordination system 130 to identify which computing devices are accessing which servers.

The transition from the client device 110 sending requests to the first server 120 to the client device 110 sending requests to the second server 125 may occur once the instructions 170 are received. In another example, the transition may occur over time. The same may be true if/when the other computing devices transition between the first server 120 and the second server 125. In yet another example, a latency determination such as described above may occur once a threshold number of client devices have transitioned from the first server 120 to the second server 125 to help ensure the second server 125 is not overloaded with new/additional requests from the other computing devices.

In some examples, it may be determined that the difference between the second latency and the first latency and/or the third latency greatly exceeds the latency difference threshold. For example, the latency difference between the second latency and the first latency may be seventy percent or more, eighty percent or more, etc. In such an example, the coordination system 130 may determine that the difference between the first latency and the second latency is suspiciously large and request that the operations described above be performed a second time to help ensure the data is accurate.

Figure 2:
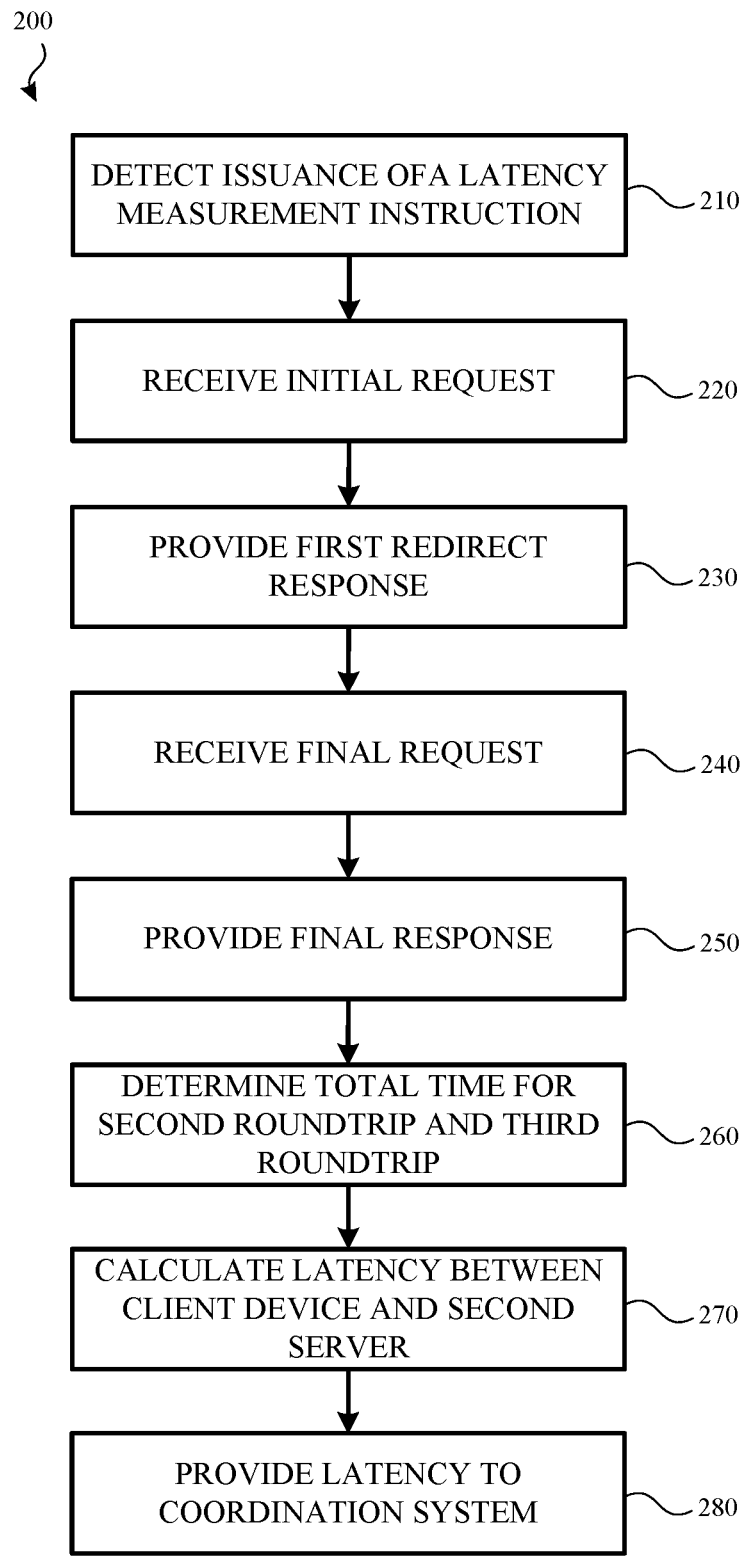
FIG. 2 illustrates a method for determining a latency between a client device and two or more servers according to an example.

FIG. 2 illustrates a method 200 for determining a latency between a client device and two or more servers according to an example. In an example, method 200, or portions of method 200, may be performed by a server in networking system. For example, the method 200 may be performed by the first server 120 of the networking system 100 shown and described with respect to FIG. 1A-FIG. 1C and/or various systems, routers, servers, etc. associated with the networking system 100.

The method 200 begins when an issuance of a latency measurement instruction is detected (210). In an example, the first server (or a client device) may detect the issuance of the latency measurement instruction by a coordination system when the first server (or the client device) receives the latency measurement instruction. In another example, the first server may detect the issuance of the latency measurement instruction by receiving an indication that a latency measurement instruction has been issued by the coordination system.

The indication may be receipt of a particular type of request from a client device. For example, the client device may send the particular type of request to the first server when the latency measurement instruction has been issued. When the first server receives the particular type of request (e.g., the request from the client device is a request for a single pixel), the first server determines that the latency measurement instruction has been issued.

The latency measurement instruction causes the first server to initiate a latency measurement between itself and the client device as well as a latency measurement between the client device and a second server. In an example, the latency measurement instruction may also provide information regarding the second server (e.g., how the client device is to access or otherwise communicate with the second server).

Once the latency measurement instruction has been received, the first server may receive (220) an initial request. The initial request may include, request, or otherwise be associated with a minimal payload in order to reduce bandwidth usage for performing the various operations described herein.

Upon receiving the initial request, the first server provides (230) a first redirect response. Operations 220 and 230 are similar to the first roundtrip described above and the amount of time it takes to complete the first roundtrip may be used to determine a first latency.

The first redirect response instructs the client device to send a second request to a neighboring server. When the client device receives the first redirect response, the client device sends a second request to a second server and receives a second redirect request such as described above. This exchange of information is referred to as the second roundtrip. The second redirect request causes the client device to submit a final request to the first server.

Upon receiving (240) the final request, the first server provides a final response (250). Operations 240 and 250 are similar to the third roundtrip described above. The amount of time it takes for the third roundtrip to occur may be used to determine a third latency.

The first server may then determine (260) the total amount of time it took for the second roundtrip to occur such as described above.

The first server may then calculate (270) the latency between the client device and the second server based on the amount of time it took to complete the second roundtrip. The latency may then be provided (280) to the coordination system.

Figure 3:
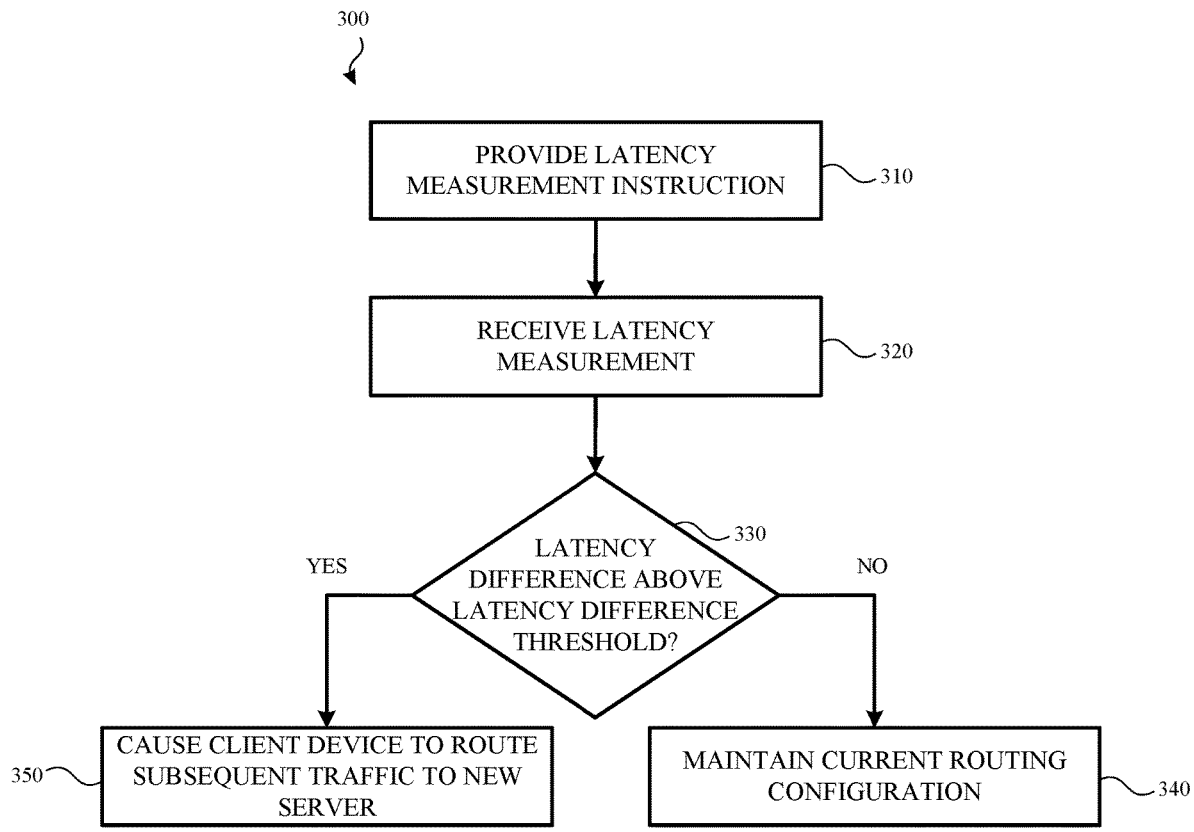
FIG. 3 illustrates a method for determining whether a measured latency between a client device and a server exceeds a latency difference threshold according to an example.

FIG. 3 illustrates a method 300 for determining whether a measured latency between a client device and a server exceeds a latency difference threshold according to an example. The method 300 may be performed by a coordination system of a networking system such as, for example coordination system 130 shown and described with respect to FIG. 1A.

Method 300 begins when the coordination system provides (310) a latency measurement instruction to a first server of the networking system and/or to a client device that is communicatively coupled to the first server. The latency measurement instruction causes the first server, a second server and the client device to perform or otherwise issue various requests and responses such as previously described.

Once the various requests and responses have been issued/received by the first server, the second server and the client device, the coordination system receives (320) a latency measurement. The latency measurement may include a first latency and a second latency. The first latency is a determined latency between the first server and the client device (e.g., determined from a first roundtrip and/or a third roundtrip such as described above). The second latency is the determined latency between the second server and the client device (e.g., determined from a second roundtrip such as described above).

When the latency measurement is received, the coordination system determines (330) whether the difference between the first latency and the second latency is above a latency difference threshold. For example, the latency difference threshold may indicate that the improvement to the second latency when compared with the first latency must be ten percent or more, twenty percent or more, etc. If the latency difference between the first latency and the second latency is above the latency difference threshold, the coordination system provides instructions to the client device to cause (350) the client device to route subsequent requests to the second server. However, if the latency difference between the first latency and the second latency is not above the latency difference threshold, the coordination system does not provide the instructions to the client device and maintains (340) the current routing configuration. In another example, the instructions to the client device may be provided to the client device via a subsequent DNS lookup or through manipulating routing. For example, a management or provisioning process may analyze a group of addresses and determine to which address the client should route the subsequent request.

Figure 4:
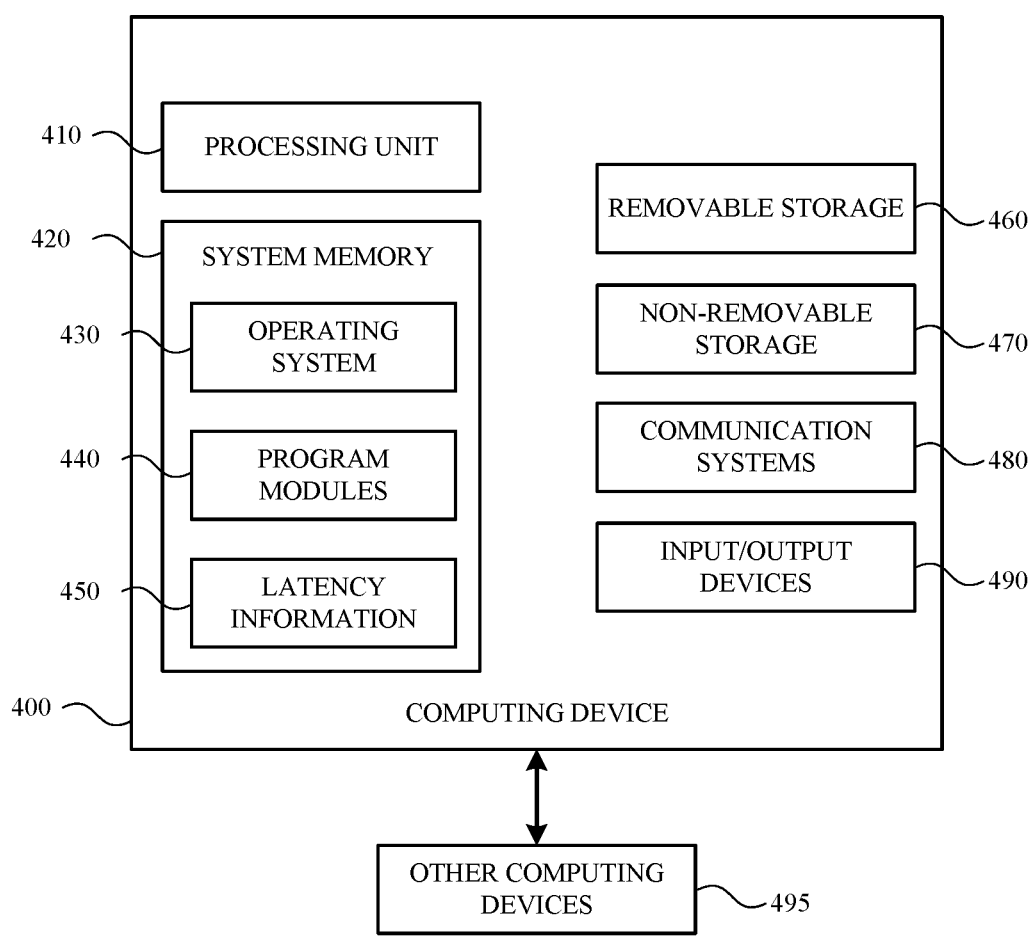
FIG. 4 is a block diagram of a computing device according to an example.

FIG. 4 is a system diagram of a computing device 400 according to an example. The computing device 400, or various components and systems of the computing device 400, may be integrated or associated with a network resource, a server, or a router, a client device, and/or a coordination system such as described herein. As shown in FIG. 4, the physical components (e.g., hardware) of the computing device are illustrated and these physical components may be used to practice the various aspects of the present disclosure.

The computing device 400 may include at least one processing unit 410 and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. The program modules 440 may be responsible for gathering or determining latency information 450 such as described above. A number of different program modules and data files may be stored in the system memory 420. While executing on the processing unit 410, the program modules 440 may perform the various processes described above.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495 such as, for example, routers, monitoring systems, servers and the like. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
   determining that a latency measurement instruction has been issued;
   receiving, at a first server, a first request from a client device;
   in response to receiving the first request from the client device, providing, by the first server, a first redirect response to the client device, the first redirect response causing the client device to submit a second request to a second server;
   determining, at the first server, a first latency measurement between the client device and the first server based on at least a first time between when the first request is submitted from the client device and received at the first server;
   receiving, at the first server, a final request, the final request being provided to the first server from the client device based on the client device receiving a second redirect response from the second server;
   determining, at the first server, a second latency measurement between the client device and the second server based, at least in part, on a second time between when the first redirect response is provided to the client device and when the final request is received by the first server;
   determining that the second latency measurement is an improvement over the first latency measurement; and
   providing instructions to the client device to issue subsequent requests to the second server based on the determination that the second latency measurement is an improvement over the first latency measurement.

2. The method of claim 1, further comprising providing the first latency measurement and the second latency measurement to a coordination system.

3. The method of claim 1, wherein the second server provides the second redirect response to the client device in response to the second server receiving the second request.

4. The method of claim 1, further comprising determining whether a latency difference between the first latency measurement and second latency measurement is above a latency difference threshold.

5. The method of claim 4, further comprising providing the instructions to the client device in response to determining the latency difference is above the latency difference threshold.

6. The method of claim 1, wherein the first request is provided to the first server based, at least in part, a property associated with the client device.

7. The method of claim 6, wherein the property indicates an amount of time the client device has been sending requests to the first server.

8. The method of claim 1, wherein the first server stores information associated with the second server.

9. The method of claim 8, wherein the information associated with the second server comprises a hop count associated with the second server.

10. A system, comprising:
    a processor; and
    a memory coupled to the processor and storing instructions that, when executed by the processor, perform operations, comprising:
    receiving a latency measurement instruction;
    receiving a first request from a client device;
    in response to receiving the first request from the client device, providing a first redirect response to the client device, the first redirect response causing the client device to submit a second request to a server;
    determining a first latency measurement between the client device and the system based on at least a first time between when the first request is submitted by the client device and received at the system;
    receiving a final request, the final request being provided from the client device based on the client device receiving a second redirect response from the server;
    determining a second latency measurement between the client device and the server based, at least in part, on a second time between when the first redirect response is provided to the client device and when the final request is received;
    determining that the second latency measurement is an improvement over the first latency measurement; and
    providing instructions to the client device to issue subsequent requests to the server based on the determination that the second latency measurement is an improvement over the first latency measurement.

11. The system of claim 10, further comprising instructions for providing the first latency measurement and the second latency measurement to a coordination system.

12. The system of claim 10, wherein the server is not visible to the client device.

13. The system of claim 10, further comprising instructions for determining whether a latency difference between the first latency measurement and second latency measurement is above a latency difference threshold.

14. The system of claim 13, further comprising instructions for providing the instructions to the client device in response to determining the latency difference is above the latency difference threshold.

15. The system of claim 10, wherein the first request is received based, at least in part, a property associated with the client device.

16. The system of claim 15, wherein the property indicates an amount of time the client device has been sending requests.

17. The system of claim 10, further comprising instructions for storing information associated with the server.

18. The system of claim 17, wherein the information associated with the server comprises a hop count associated with the server.

19. A method, comprising:
providing a latency measurement instruction to a first server, the latency measurement instruction causing:
the first server to receive a first request from a client device;
the first server to provide a first redirect response to the client device in response to receiving the first request, the first redirect response causing the client device to submit a second request to a second server;
the first server to determine a first latency measurement between the client device and the first server based on at least a first time between when the first request is submitted from the client device and is received at the first server;
the first server to receive a final request, the final request being provided from the client device based on the client device receiving a second redirect response from the second server; and
the first server to determine a second latency measurement between the client device and the second server based, at least in part, on a second time between when the first redirect response is provided to the client device and when the final request is received by the first server;
receiving the first latency measurement and the second latency measurement from the first server;
determining that the second latency measurement is an improvement over the first latency measurement; and
providing instructions to the client device to issue subsequent requests to the second server based on the determination that the second latency measurement is an improvement over the first latency measurement.

20. The method of claim 19, further comprising determining whether a latency difference between the first latency measurement and second latency measurement is above a latency difference threshold.

* * * * *